United States Patent
McDaniel et al.

(10) Patent No.: US 10,557,072 B2
(45) Date of Patent: Feb. 11, 2020

(54) DRILLING FLUID FOR DOWNHOLE ELECTROCRUSHING DRILLING

(71) Applicants: Halliburton Energy Services, Inc., Houston, TX (US); Chevron U.S.A. Inc., San Ramon, CA (US)

(72) Inventors: Cato Russell McDaniel, The Woodlands, TX (US); William Walter Shumway, Spring, TX (US); Donald Curtis Van Slyke, Richmond, TX (US)

(73) Assignees: Halliburton Energy Services, Inc., Houston, TX (US); Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 15/534,820

(22) PCT Filed: Jun. 16, 2016

(86) PCT No.: PCT/US2016/037856
§ 371 (c)(1),
(2) Date: Jun. 9, 2017

(87) PCT Pub. No.: WO2017/217995
PCT Pub. Date: Dec. 21, 2017

(65) Prior Publication Data
US 2018/0201822 A1    Jul. 19, 2018

(51) Int. Cl.
*C09K 8/34* (2006.01)
*E21B 7/15* (2006.01)

(52) U.S. Cl.
CPC .............. *C09K 8/34* (2013.01); *E21B 7/15* (2013.01); *C09K 2208/32* (2013.01); *C09K 2208/34* (2013.01)

(58) Field of Classification Search
None
See application file for complete search history.

(56) References Cited

U.S. PATENT DOCUMENTS 5,072,794 A     12/1991  Hale et al.
6,787,505 B1 *  9/2004   Maitland ................. C09K 8/32
                                                166/254.2
(Continued)

FOREIGN PATENT DOCUMENTS

CA    2877788    1/2014
CA    3022524    12/2017
(Continued)

OTHER PUBLICATIONS

Note, Application. "Solutions for measuring permittivity and permeability with LCR meters and impedance analyzers." Agilent Literature No. (2008).; 25 pages.
(Continued)

*Primary Examiner* — Jeffrey D Washville
(74) *Attorney, Agent, or Firm* — Baker Botts L.L.P.

(57) ABSTRACT

The disclosure relates to an electrocrushing drilling fluid with an electrocrushing drilling base fluid including a polar oil, a non-polar oil, or a combination thereof and glycerine carbonate. The electrocrushing drilling fluid or base fluid may further include water or glycerin. The electrocrushing drilling fluid may further contain at least one additive. The electrocrushing drilling fluid may have a dielectric constant or dielectric strength of at least a set amount, an electric conductivity less than a set amount, or a combination of these properties. The disclosure further relates to an electrocrushing drilling system containing the electrocrushing drilling fluid and an electrocrushing drill bit.

8 Claims, 2 Drawing Sheets

(56) References Cited

U.S. PATENT DOCUMENTS

| | | | |
|---|---|---|---|
| 7,959,094 | B2 | 6/2011 | Moeny |
| 9,190,190 | B1 | 11/2015 | Moeny |
| 2004/0014609 | A1 | 1/2004 | Dalmazzone et al. |
| 2006/0037516 | A1 | 2/2006 | Moeny |
| 2009/0133929 | A1 | 5/2009 | Rodland |
| 2010/0212962 | A1 | 8/2010 | Rosten et al. |
| 2013/0112482 | A1 | 5/2013 | Armistead et al. |
| 2014/0066338 | A1 | 3/2014 | Wagle et al. |
| 2014/0303049 | A1* | 10/2014 | Holdsworth ............ C09K 8/56 507/241 |
| 2015/0027702 | A1* | 1/2015 | Godoy-Vargas ......... C09K 8/90 166/279 |
| 2015/0322326 | A1* | 11/2015 | Van Slyke ............... C09K 8/34 175/16 |
| 2016/0017663 | A1 | 1/2016 | Moeny |
| 2016/0152883 | A1 | 6/2016 | Fernandez et al. |
| 2017/0067292 | A1 | 3/2017 | Bayol et al. |

FOREIGN PATENT DOCUMENTS

| | | |
|---|---|---|
| CN | 103131398 | 6/2013 |
| WO | 96/22342 | 7/1996 |
| WO | 2006/023998 | 3/2006 |
| WO | 2013/184457 | 12/2013 |
| WO | 2015/124733 | 8/2015 |
| WO | WO 2015/124733 | 8/2015 |
| WO | 2016/053236 | 4/2016 |

OTHER PUBLICATIONS

Keysight Technologies, "Keysight 16452A Liquid Test Fixture." Operation and Service Manual, Nov. 4, 2014; 51 pages.

International Search Report and Written Opinion for PCT Patent Application No. PCT/US2016/037856, dated Mar. 15, 2017; 12 pages.

International Search Report and Written Opinion for PCT Patent Application No. PCT/US2016/037827, dated Mar. 15, 2017; 12 pages.

International Search Report and Written Opinion for PCT Patent Application No. PCT/US2016/037835, dated Feb. 28, 2017; 15 pages.

International Search Report and Written Opinion for PCT Patent Application No. PCT/US2016/037841, dated Mar. 15, 2017; 15 pages.

Bluhm, H., et al. "Application of pulsed HV discharges to material fragmentation and recycling," *IEEE Transactions on Dielectrics and Electrical Insulation* 7.5 (2000): 625-636 12 pages.

Timoshkin, Igor V., John W. Mackersie, and Scott J. MacGregor. "Plasma channel miniature hole drilling technology." *IEEE Transactions on plasma science* 32.5 (2004): 2055-2061; 7 pages.

Biela, Juergen, et al. "Solid state modulator for plasma channel drilling." *IEEE Transactions on Dielectrics and Electrical Insulation* 16.4 (2009): 1093-1099; 7 pages.

Extended European Search Report for European Patent Application No. 16905650.4, dated Oct. 31, 2019; 9 pages.

Office Action for Canadian Patent Application No. 3023452, dated Oct. 16, 2019; 4 pages.

\* cited by examiner

DRILLING FLUID FOR DOWNHOLE ELECTROCRUSHING DRILLING

RELATED APPLICATIONS

This application is a U.S. National Stage Application of International Application No. PCT/US2016/037856 filed Jun. 16, 2016, which designates the United States, and is incorporated herein by reference in its entirety.

TECHNICAL FIELD

The present disclosure relates generally to a drilling fluid for downhole electrocrushing drilling.

BACKGROUND

Electrocrushing drilling uses pulsed power technology to drill a borehole in a rock formation. Pulsed power technology repeatedly applies a high electric potential across the electrodes of an electrocrushing drill bit, which ultimately causes the surrounding rock to fracture.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Electrocrushing drilling may be used to form wellbores in subterranean rock formations for recovering hydrocarbons, such as oil and gas, from these formations. Electrocrushing drilling uses pulsed-power technology to repeatedly fracture the rock formation by repeatedly delivering high-energy electrical pulses to the rock formation. The fractured rock is removed from the vicinity of the electrocrushing drill bit by drilling fluid. Although drilling fluids used in conventional mechanical drill bit drilling methods also remove fractured rock from the vicinity of the drill bit, thereby allowing drilling to progress downhole, drilling fluids suitable for use with a conventional mechanical drill bit are typically not suitable for use with an electrocrushing drill bit. Electrocrushing drilling fluids have a sufficiently high frequency dependent dielectric constant (also referred to as dielectric constant herein) and dielectric strength, and a sufficiently low electrical conductivity to allow an electrocrushing drill bit to direct an arc of electric current through a portion of the rock in the formation, heating water and other materials in the rock and causing that rock and surrounding rock to fracture.

For a given electrocrushing drill bit, the dielectric constant and dielectric strength of the drilling fluid are sufficiently high if electric fields generated by the electrocrushing drill bit are directed away from the drilling fluid and into the rock formation, the rock formation is still fractured, the drilling operation proceeds downhole at at least a set rate, the drilling operation is economically viable, or any combination of these parameters.

For a given electrocrushing drill bit, the electrical conductivity of a drilling fluid is sufficiently low if leakage current from the electrocrushing drill bit into the drilling fluid is sufficiently low that the rock formation is still fractured, the drilling operation proceeds downhole at at least a set rate, the drilling operation is economically viable, or any combination of these parameters.

Typically, an electrocrushing drilling fluid will have both sufficient dielectric and electric conductivity properties.

Furthermore, some electrocrushing drilling fluids and electrocrushing drilling systems using such fluids additionally differ from conventional drilling fluids and systems by being more resistant to cavitation caused by electrocrushing drilling or by better mitigating cavitation effects.

An electrocrushing drilling fluid of the present disclosure may include a base fluid containing a polar oil or a non-polar oil, or a combination thereof and glycerine carbonate. The ratio of polar oil or non polar-oil, or combination thereof to glycerine carbonate by volume may be between 0.85:1 and 1.15:1, between 0.95:1 and 1.05:1, or 1:1.

The electrocrushing drilling fluid or the electrocrushing drilling base fluid may further contain water either before use or after use, as water frequently enters the drilling fluid from the formation during use. Salts may also be present because they are dissolved in the water.

The electrocrushing drilling fluid may also contain additives.

Figure 1:
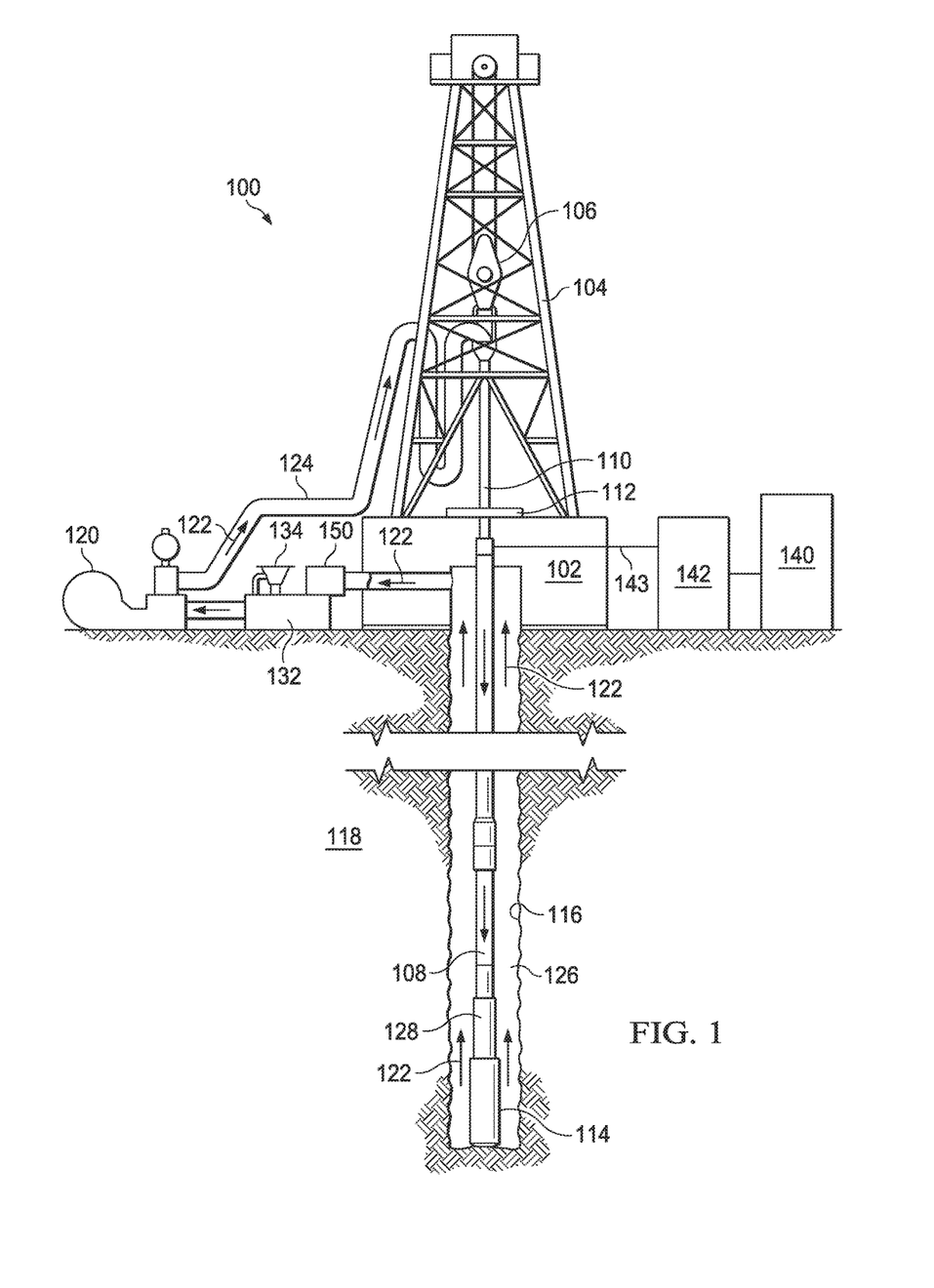
FIG. 1 is an elevation view of a downhole electrocrushing drilling system used in a wellbore environment.
Figure 2:
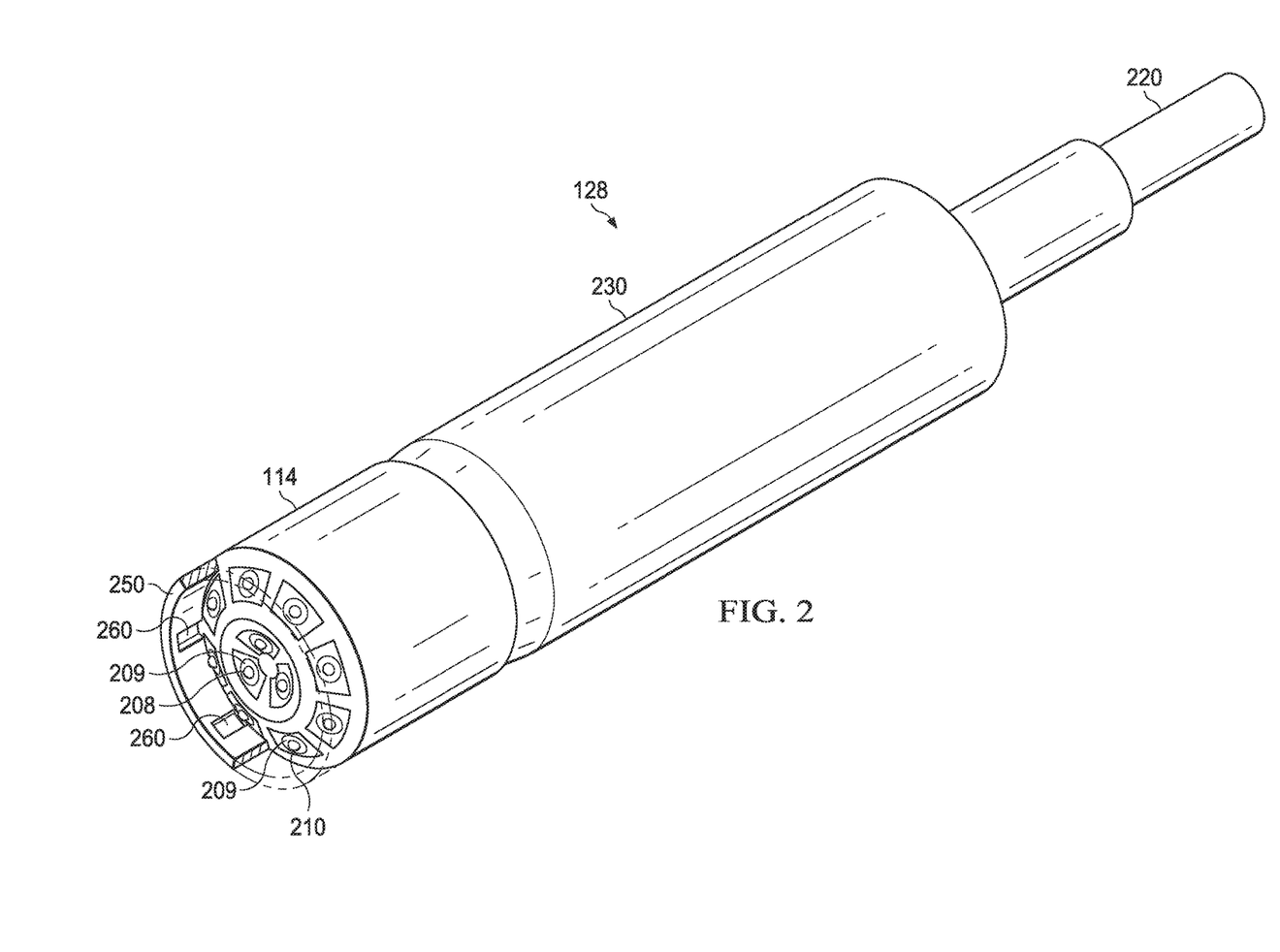
FIG. 2 illustrates exemplary components of a bottom hole assembly for a downhole electrocrushing drilling system.

Drilling System Using an Electrocrushing Drill Bit and Electrocrushing Drilling Fluid Embodiments of the present disclosure and its advantages may be understood by referring to FIGS. 1 and 2, where like numbers are used to indicate like and corresponding parts.

FIG. 1 is an elevation view of an exemplary electrocrushing drilling system used to form a wellbore in a subterranean formation. Although FIG. 1 shows land-based equipment, downhole tools incorporating teachings of the present disclosure may be satisfactorily used with equipment located on offshore platforms, drill ships, semi-submersibles, and drilling barges (not expressly shown). Additionally, while wellbore 116 is shown as being a generally vertical wellbore, wellbore 116 may be any orientation including generally horizontal, multilateral, or directional.

Drilling system 100 includes drilling platform 102 that supports derrick 104 having traveling block 106 for raising and lowering drill string 108. Drilling system 100 also includes pump 104, which circulates electrocrushing drilling fluid 122 through feed pipe 124 to kelly 110, which in turn conveys electrocrushing drilling fluid 122 downhole through interior channels of drill string 108 and through one or more orifices in electrocrushing drill bit 114. Electrocrushing drilling fluid 122 then circulates back to the surface via annulus 126 formed between drill string 108 and the sidewalls of wellbore 116. Typically, during use of drilling system 100, electrocrushing drilling fluid 122 carries fractured rock formed by electrocrushing drill bit 114 back to the surface with it.

Electrocrushing drill bit 114 is attached to the distal end of drill string 108. In some embodiments, electrocrushing drill bit 114 may be supplied power from the surface. For example, generator 140 may generate electrical power and provide that power to power-conditioning unit 142. Power-conditioning unit 142 may then transmit electrical energy downhole via surface cable 143 and a sub-surface cable (not expressly shown in FIG. 1) contained within drill string 108. A pulse-generating circuit within bottom-hole assembly (BHA) 128 may receive the electrical energy from power-conditioning unit 142, and may generate high-energy pulses to drive electrocrushing drill bit 114.

For example, pulsed-power technology may be utilized to repeatedly apply a high electric potential, for example up to or exceeding 150 kV, across the electrodes of electrocrushing drill bit 114. Each application of electric potential is referred to as a pulse. When the electric potential across the electrodes of electrocrushing drill bit 114 is increased enough during a pulse to generate a sufficiently high electric field, an electrical arc forms through a rock formation at the bottom of wellbore 116. The arc temporarily forms an electrical coupling between the electrodes, allowing electric current to flow through the arc inside a portion of the rock formation at the bottom of wellbore 116. The arc greatly increases the temperature and pressure of the portion of the rock formation through which the arc flows and the surrounding formation and materials. The temperature and pressure is sufficiently high to break the rock itself onto small bits or cuttings.

As electrocrushing drill bit 114 repeatedly fractures rock and electrocrushing drilling fluid 122 moves the fractured rock uphole, wellbore 116, which penetrates various subterranean rock formations 118, is created. Wellbore 116 may be any hole drilled into a subterranean formation or series of subterranean formations for the purpose of exploration or extraction of natural resources such as, for example, hydrocarbons, or for the purpose of injection of fluids such as, for example, water, wastewater, brine, or water mixed with other fluids. Additionally, wellbore 116 may be any hole drilled into a subterranean formation or series of subterranean formations for the purpose of geothermal power generation.

FIG. 2 illustrates exemplary components of a bottom hole assembly for downhole electrocrushing drilling system 100. Bottom-hole assembly (BHA) 128 may include pulsed-power tool 230. BHA 128 may also include electrocrushing drill bit 114. For the purposes of the present disclosure, electrocrushing drill bit 114 may be referred to as being integrated within BHA 128, or may be referred to as a separate component that is coupled to BHA 128.

Pulsed-power tool 230 may be coupled to provide pulsed power to electrocrushing drill bit 114. Pulsed-power tool 230 receives electrical energy from a power source via cable 220. For example, pulsed-power tool 230 may receive power via cable 220 from a power source on the surface as described above with reference to FIG. 1, or from a power source located downhole such as a generator powered by a mud turbine. Pulsed-power tool 230 may also receive power via a combination of a power source on the surface and a power source located downhole. Pulsed-power tool 230 converts the electrical energy received from the power source into high-power electrical pulses, and may apply those high-power pulses across electrodes of electrocrushing drill bit 114. For the purposes of the present disclosure, ground ring 250 may also be referred to generally as an electrode or more specifically as a ground electrode. In one example, pulsed-power tool 230 may apply the high-power pulses across electrode 208 and ground ring 250 of electrocrushing drill bit 114. Pulsed-power tool 230 may also apply high-power pulses across electrode 210 and ground ring 250 in a similar manner as described herein for electrode 208 and ground ring 250.

Pulsed-power tool 230 may include a pulse-generating circuit. Such a pulse-generating circuit may include high-power capacitors and which may include fuse-protection.

Referring to FIG. 1 and FIG. 2, electrocrushing drilling fluid 122 may exit drill string 108 via openings 209 surrounding each electrode 208 and each electrode 210. The flow of electrocrushing drill fluid 122 out of openings 209 allows electrodes 208 and 210 to be insulated by the electrocrushing drilling fluid. In some embodiments, electrocrushing drill bit 114 may include a solid insulator (not expressly shown in FIG. 1 or 2) surrounding electrodes 208 and 210 and one or more orifices (not expressly shown in FIG. 1 or 2) on the face of electrocrushing drill bit 114 through which electrocrushing drilling fluid 122 may exit drill string 108. Such orifices may be simple holes, or they may be nozzles or other shaped features. Because fines are not typically generated during electrocrushing drilling, as opposed to mechanical drilling, electrocrushing drilling fluid 122 may not need to exit the drill bit at as high a pressure as the drilling fluid in mechanical drilling. As a result, nozzles and other features used to increase drilling fluid pressure may not be needed. However, nozzles or other features to increase electrocrushing drilling fluid 122 pressure or to direct electrocrushing drilling fluid may be included for some uses.

Drilling fluid 122 is typically circulated through drilling system 100 at a flow rate sufficient to remove fractured rock from the vicinity of electrocrushing drill bit 114 in sufficient quantities within a sufficient time to allow the drilling operation to proceed downhole at least at a set rate. In addition, electrocrushing drilling fluid 122 may be under sufficient pressure at a location in wellbore 116, particularly a location near a hydrocarbon, gas, water, or other deposit, to prevent a blowout.

Electrodes 208 and 210 may be at least 0.4 inches apart from ground ring 250 at their closest spacing, at least 1 inch apart at their closest spacing, at least 1.5 inches apart at their closest spacing, or at least 2 inches apart at their closest spacing. If drilling system 100 experiences vaporization bubbles in electrocrushing drilling fluid 122 near electrocrushing drill bit 114, the vaporization bubbles may have deleterious effects. For instance, vaporization bubbles near electrodes 208 or 210 may impede formation of the arc in the rock. Electrocrushing drilling fluids 122 may be circulated at a flow rate also sufficient to remove vaporization bubbles from the vicinity of electrocrushing drill bit 114.

In addition, electrocrushing drill bit 114 may include ground ring 250, shown in part in FIG. 2. Although not all electrocrushing drill bits 114 may have ground ring 250, if it is present, it may contain passages 260 to permit the flow of electrocrushing drilling fluid 122 along with any fractured rock or bubbles away from electrodes 208 and 210 and uphole.

Referring again to FIG. 1, at the surface, recirculated or spent electrocrushing drilling fluid 122 exits annulus 126. Recirculated or spent electrocrushing drilling fluid 122 may simply be directed back into drill string 108 or may otherwise be processed using only some of the equipment shown in FIG. 1. However, in the drilling system 100, electrocrushing drilling fluid 122 is conveyed to one or more fluid processing units 150 via an interconnecting flow line 130. After passing through fluid processing units 150, cleaned electrocrushing drilling fluid 122 is deposited into retention pit 132. Although fluid processing unit 150 is illustrated in FIG. 1 near the outlet of the wellbore 116, fluid processing unit 150 may be located at a distance from the outlet of wellbore 116.

Drilling system 100 may further include mixing hopper 134 communicably coupled to or otherwise in fluidic communication with retention pit 132. Mixing hopper 134 may include, but is not limited to, mixers and related mixing equipment. Mixing hopper 134 may be used to add additives to electrocrushing drilling fluid 122.

Drilling fluid 122 is typically circulated through drilling system 100 at a flow rate sufficient to remove fractured rock from the vicinity of electrocrushing drill bit 114 in sufficient quantities within a sufficient time to allow the drilling operation to proceed downhole at at least a set rate.

In addition, electrocrushing drilling fluid 122 may be under sufficient pressure at a location in wellbore 116, particularly a location near a hydrocarbon, gas, water, or other deposit, to prevent a blowout.

If drilling system 100 experiences cavitation in electrocrushing drilling fluid 122 near electrocrushing drill bit 112, the may have various deleterious effects. For instance, cavitation bubbles near electrodes 208 and 210 may impede formation of the arc in the rock. Electrocrushing drilling fluids 122 may be circulated at a flow rate also sufficient to remove cavitation bubbles from the vicinity of electrocrushing drill bit 114 in sufficient quantities within a sufficient time to allow the drilling operation to proceed downhole at at least a set rate and to avoid damage to drill bit 112 from the cavitation bubbles, for instance damage resulting from the cavitation bubbles reentering drill bit 112.

Electrocrushing Drilling Fluid

To limit discharge of the electric field through electrocrushing drilling fluid 122 and allow more electrical current to flow into the rock at the end of wellbore 116, an electrically insulating electrocrushing drilling fluid 122 with a high dielectric constant and a high dielectric strength at a particular operating frequency may be used. An electrically insulating electrocrushing drilling fluid 122 restricts the movement of electrical charges, and therefore, the flow of electrical current through the electrocrushing drilling fluid 122. A high dielectric constant and high dielectric strength decrease electrical discharge through electrocrushing drilling fluid 122. The dielectric constant of the downhole fluid indicates the ability of the electrocrushing drilling fluid to store electrical energy when exposed to an electric field, such as the potential created by electrocrushing drill bit 114, while the dielectric strength of the downhole fluid indicates a voltage level to which electrocrushing drilling fluid 122 may be exposed before experiencing electrical breakdown, or a loss of its electrically insulating properties.

Electrocrushing drilling fluid 122 may be formulated to have:

i) at least a set dielectric constant, such as at least 6, at least 10, at least 12, or at least 13 (at 100 kHz frequency), ii) at least a set dielectric strength, such as at least 100 kV/cm, at least 150 kV/cm, or at least 330 kV/cm (at 10 microseconds rise time), iii) less than a set electric conductivity, such as less than $10^{-4}$ mho/cm, or less than $10^{-5}$ mho/cm, or any combinations thereof.

Electrocrushing drilling fluid 122 includes an electrocrushing drilling base fluid and may include one or more additives. Generally, the electrocrushing drilling base fluid may be present in an amount sufficient to form a pumpable electrocrushing drilling fluid. By way of example, the electrocrushing drilling base fluid may be present in electrocrushing drilling fluid 122 in an amount in the range of from 20% to 99.99% by volume of electrocrushing drilling fluid 122.

The electrocrushing drilling base fluid includes a polar oil, a non-polar oil, or a combination thereof and glycerine carbonate.

Polar oil, if present, may include a combination of polar oils. Polar oils may include a vegetable oil, such as castor oil, a ester oil, such as a polyol ester or monoester oil, or any combination thereof. Polyol ester and monoester oils may provide greater hydrolytic stability, lower viscosity, or both as compared to vegetable oils.

A polar oil may include any ester of a carboxylic acid, such as a carboxylic acid with between 8 and 20 carbons, and 0, 1, or 2 moles of unsaturation. The carboxylic acid may be esterified using an alcohol, such as methanol, isopropanol, or 2-ethylhexanol.

A polar vegetable oil may include esters of vegetable oils such as esters of palm oil, palm kernal oil, rape seed oil, soybean oil, steric acid, oleic acid, and linoleic acid, and any combinations thereof.

A polyol ester oil may include a glycol ester oil, such as a neopentyl glycol diester.

A monoester oil may include hexanyl propanoate and isomers, hexanyl butyrate and isomers, hexanyl hexanoate and isomers, hexanyl octanoate and isomers, hexanyl decanoate and isomers, hexanyl laureate and isomers, hexanyl palmitate and isomers, hexanyl hexadecanoate and isomers, hexanyl stearate and isomers, octanyl propanoate and isomers, octanyl butyrate and isomers, octanyl hexanoate and isomers, octanyl octanoate and isomers, octanyl decanoate and isomers, octanyl laureate and isomers, octanyl palmitate and isomers, octanyl hexadecanoate and isomers, octanyl stearate and isomers, decanyl propanoate and isomers, decanyl butyrate and isomers, decanyl hexanoate and isomers, decanyl octanoate and isomers, decanyl decanoate and isomers, decanyl laureate and isomers, decanyl palmitate and isomers, decanyl hexadecanoate and isomers, decanyl stearate and isomers, dodecanyl propanoate and isomers, dodecanyl butyrate and isomers, dodecanyl hexanoate and isomers, dodecanyl octanoate and isomers, dodecanyl decanoate and isomers, dodecanyl laureate and isomers, dodecanyl palmitate and isomers, dodecanyl hexadecanoate and isomers, dodecanyl stearate and isomers, tetradecanyl propanoate and isomers, tetradecanyl butyrate and isomers, tetradecanyl hexanoate and isomers, tetradecanyl octanoate and isomers, tetradecanyl decanoate and isomers, tetradecanyl laureate and isomers, tetradecanyl palmitate and isomers, tetradecanyl hexadecanoate and isomers, tetradecanyl stearate and isomers, hexadecanyl propanoate and isomers, hexadecanyl butyrate and isomers, hexadecanyl hexanoate and isomers, hexadecanyl octanoate and isomers, hexadecanyl decanoate and isomers, hexadecanyl laureate and isomers, hexadecanyl palmitate and isomers, hexadecanyl hexadecanoate and isomers, hexadecanyl stearate and isomers, octadecanyl propanoate and isomers, octadecanyl butyrate and isomers, octadecanyl hexanoate and isomers, octadecanyl octanoate and isomers, octadecanyl decanoate and isomers, octadecanyl laureate and isomers, octadecanyl palmitate and isomers, octadecanyl hexadecanoate and isomers, octadecanyl stearate and isomers, icosanyl propanoate and isomers, icosanyl butyrate and isomers, icosanyl hexanoate and isomers, icosanyl octanoate and isomers, icosanyl decanoate and isomers, icosanyl laureate and isomers, icosanyl palmitate and isomers, icosanyl hexadecanoate and isomers, icosanyl stearate and isomers, docosanyl propanoate and isomers, docosanyl butyrate and isomers, docosanyl hexanoate and isomers, docosanyl octanoate and isomers, docosanyl decanoate and isomers, docosanyl laureate and isomers, docosanyl palmitate and isomers, docosanyl hexadecanoate and isomers, docosanyl stearate, and any combinations thereof.

Specific suitable non-polar oils include PETROFREE® (Halliburton, Tex., US), which is an ester of 2-ethylhexanol reacted with palm kernel fatty acid, and PETROFREE LV® (Halliburton, Tex., US), which is an ester of 2-ethylhexanol reacted with C6 to C10 fatty acids.

Non-polar oils typically have a high dielectric strength and a low electric conductivity, making them a suitable replacement for alkylene carbonate in electrocrushing drilling base fluids. However, non-polar oils have a low dielectric constant, may be included with other components with a higher dielectric constant in an electrocrushing drilling base fluid. A non-polar oil suitable for use in an electrocrushing drilling base fluid of the present disclosure includes combinations of non-polar oils. Suitable non-polar oils include mineral oils, diesel oils or fuels, paraffin-based oils, oils containing branched and linear aliphatic hydrocarbons having between 8 and 26 carbon atoms and a boiling point in the range of 120° C. to 380° C., oils containing hydrocarbons having between 10 and 16 carbon atoms and a viscosity of 1.5 to 2 cSt at 40° C. Any of the non-polar oils or combinations thereof may have a viscosity of less than 4 cSt at 40° C.

Combinations of polar oils and non-polar oils may also be used.

Polar oils tend to have dielectric constants or dielectric strengths that are too low for electrocrushing drilling. As a result, glycerine carbonate may be added to the polar oil to improve these properties because it has a high dielectric constant and moderate dielectric strength and is more oil soluble than many other alkylene carbonates. However, the amount of glycerine carbonate in the electrocrushing drilling base oil may be limited by its high electric conductivity. Other alkylene carbonates may also be present in the electrocrushing drilling base oil, or it may have no or less than 0.1% by weight or volume other alkylene carbonates.

The electrocrushing drilling fluid or base fluid also contains water. Water has a low viscosity and a high dielectric strength, but it also has a high electric conductivity, thus potentially limiting its proportional volume in an electrocrushing drilling fluid or base fluid. The electric conductivity of water further increases if salts are dissolved in the water, a frequent occurrence during drilling.

Water also has a highly temperature-variable dielectric constant that decreases with temperature and thus which may also limit water's proportional volume in an electrocrushing drilling fluid or base fluid because the electrocrushing drilling fluid typically experiences high temperatures in the vicinity of the electrocrushing drill bit.

The electrocrushing drilling fluid or base fluid may further include glycerin. Glycerin has a high dielectric constant and low electric conductivity, but also low dielectric strength, thus potentially limiting its proportional volume in an electrocrushing drilling fluid or base fluid.

One or more electrical additives may change one or more electrical properties of the electrocrushing drilling base fluid. For instance, an electrical additive may change a dielectric property of the electrocrushing drilling base fluid. Such additives may include mica in any of its various forms such as muscovite, phlogopite, leidolite, fluorophlogopite, glass-bonded mica, and biotite, polytetrafluoroethylene, other chemical variants of tetrafluoroethylene, glass or a composition of glass including fused silica and alkali-silicate, polystyrene, polyethylene, diamond, lead zirconate titanate (PZT), sodium chloride crystalline, potassium bromide crystalline, silicone oil, benzene, and any combinations thereof. The electrical additive may be present in an electrocrushing drilling fluid in an amount sufficient for a particular drilling system, formation, or combination thereof. The type of electrical additive or combination of electrical additives in an electrocrushing drilling fluid may also be based at least partially upon a particular drilling system, formation, or combination thereof.

The electrocrushing drilling fluid may further include additives used in conventional drilling fluids. These additives may provide properties to the electrocrushing drilling fluid similar to the properties they provide to conventional drilling fluids. However, some additives used in conventional drilling fluids may not be suitable for an electrocrushing drilling fluid due to their effects on dielectric constant, dielectric strength, or electric conductivity, or because they are not compatible with an electrocrushing drill bit.

Additives may include a lost circulation prevention material, such as a bridging material or a fluid loss control agent, a rheology modifier, such as a viscosifier or a thinner, a weighting agent, a solids wetting agent, an acid or $H_2S$ scavenger, a lubricant other additives, and any combinations thereof.

Lost circulation materials are capable of reducing the amount of whole drilling fluid that is lost to fractures and natural caverns during the drilling process. Lost circulation materials include mica, fibers, and hard organic materials, such as nutshells. The lost circulation material may be present in an electrocrushing drilling fluid in an amount sufficient for a particular drilling system, formation, or combination thereof. The type of lost circulation material or combination of lost circulation materials in an electrocrushing drilling fluid may also be based at least partially upon a particular drilling system, formation, or combination thereof.

Lost circulation materials include bridging materials, which bridge across pores and fractures in the formation and help prevent loss of drilling fluid into the formation. Bridging materials may include calcium carbonate, salt suspensions, resins, BARACARB® (Halliburton, Tex., US) size-ground marble, N-SEAL™ (Halliburton, Tex., US) extrusion spun mineral fiber or similar materials.

Fluid loss control agents, which help control loss of the liquid portion of the drilling fluid into the formation, may also be used in the electrocrushing drilling fluid. Fluid loss control agents include clays and polymers, such as synthetic polymers or natural polymers, such as lignitic polymers.

Rheology modifiers change the flow properties of the electrocrushing drilling fluid. Rheology modifiers may, for instance, change the shear properties or viscosity of the drilling fluid. The rheology modifier may be present in the electrocrushing drilling fluid in an amount sufficient for a particular drilling system, formation, or combination thereof. The type of rheology modifier or combination of rheology modifiers in the electrocrushing drilling fluid may also be based at least partially upon a particular drilling system, formation, or combination thereof.

Thinners are a type of rheology modifier that decrease the viscosity of a drilling fluid. In drilling fluids that experience flocculation, such as drilling fluids containing some clays, thinners may also be deflocculants. Electrocrushing drilling may benefit from a low viscosity drilling fluid, such that thinners may be a particularly useful additive.

Viscosifiers increase the viscosity of a drilling fluid. A viscosifier may be used in the drilling fluid to impart a sufficient carrying capacity or thixoropy or both to the drilling fluid, enabling the drilling fluid to transport and prevent settling of fractured rock or weighting materials, or both. Suitable viscosifiers include organophilic clays such as GELTONE® II viscosifier (Halliburton, Tex., US), polymeric viscosifiers, such as BARARESIN® VIS viscosifier (Halliburton, Tex., US), long chain fatty acids, dimer/trimer/tetramer fatty acids (RM-63™ viscosifier, Halliburton, Tex., US), and any combinations thereof.

The electrocrushing drilling fluid may have a viscosity at surface temperature and pressure sufficient to allow it to suspend any particles additives, such as barite or a dielectric modifier, while still allowing it to be pumped downhole. In the wellbore, the drilling fluid may maintain a viscosity sufficient to allow it to suspend any particle additives, while still allowing it to circulate through and out of the wellbore. The electrocrushing drilling fluid may further maintain a viscosity upon return to surface pressure or temperature sufficient to allow it to exit the wellbore. The electrocrushing drilling fluid may also further maintain its viscosity to allow it to continue to suspend any particles additives, such as barite, until it reaches a holding tank, through any cleaning or testing process, or until it is returned to a wellbore, as applicable.

Emulsifiers help create a mixture of two immiscible liquids, such as an oil-based liquid and an aqueous liquid. Suitable emulsifiers include polyaminated fatty acids. Electrocrushing drilling fluid 122 is an invert emulsion and thus may particularly benefit from an emulsifier. The emulsifier may be present in electrocrushing drilling fluid 122 in an amount sufficient for a particular drilling system, formation, or combination thereof. The type of emulsifier or combination of emulsifier in electrocrushing drilling fluid 122 may also be based at least partially upon the immiscible components of electrocrushing drilling fluid 122, a particular drilling system, formation, or combination thereof.

Weighting agents increase the density of an electrocrushing drilling fluid without being dissolved in it. Suitable weighting agents include barite, hematite, ilmenite, manganese tetraoxide, and any combinations thereof. The weighting agent may be present in an electrocrushing drilling fluid in an amount sufficient for a particular drilling system, formation, or combination thereof. The type of weighting agent or combination of weighting agents in an electrocrushing drilling fluid may also be based at least partially upon a particular drilling system, formation, or combination thereof. Typically, for electrocrushing drilling, the amount of weighing agent present is sufficient to maintain an electrocrushing drilling fluid density between 8 lb/gallon and 21 lb/gallon.

Other additives may include corrosion inhibitors, defoamers, shale stabilizers, lubricants, wetting agents, dispersing agents, shale inhibitors, pH-control agents, filtration-control agents, alkalinity sources such as lime and calcium hydroxide, salts, foamers, viscosifiers, thinners, deflocculents, or any combinations thereof. The other additives may be present an electrocrushing drilling fluid in an amount sufficient for a particular drilling system, formation, or combination thereof. The type of other additives or combination of other additives in an electrocrushing drilling fluid may also be based at least partially upon a particular drilling system, formation, or combination thereof.

Some additives, such as lignitic fluid loss control agents and polaminated fatty acid emulsifiers, may have synergistic effects.

In addition to conventional uses for additives, some additives may have a further effect or may be added solely for the effect of rendering the electrocrushing drilling fluid or the drilling system more resistant to cavitation caused by electrocrushing drilling or by better mitigating cavitation effect as compared to conventional drilling fluids or electrocrushing drilling fluids without the additive.

EXAMPLES

The following examples are provided to further illustrate certain aspects of the invention and should not be interpreted as disclosing the invention as a whole. In particular, substitutions within these examples in accordance with the above disclosure are also encompassed by the invention.

In the following examples, lb/bbl is one pound per 42 gallons of total electrocrushing drilling fluid.

Example 1: Electrocrushing Drilling Fluid with Polar Oil and Glycerine Carbonate The following components were mixed at to yield a suitable electrocrushing drilling fluid:
  2 lb/bbl Adapta® (Halliburton, Tex., US) methylstyrene/acrylate copolymer lost circulation material
  8 lb/bbl LE Supermul® (Halliburton, Tex., US) polyaminated fatty acid emulsifier
  2 lb/bbl Rhemod L® (Halliburton, Tex., US) modified fatty acid containing dimeric and trimeric fatty acids viscosifier
  92.5 lb/bbl glycerine carbonate
  56 lb/bbl Petrofree® (Halliburton, Tex., US) ester polar oil
  119.8 lb/bbl Baroid® (Halliburton, Tex., US) barite weighting agent
  25.28 lb/bbl water
  10.14 lb/bbl calcium chloride.

Example 2: Electrocrushing Drilling Fluid with Non-Polar Oil and Glycerine Carbonate The following components were mixed at to yield a suitable electrocrushing drilling fluid:
  2 lb/bbl Adapta® (Halliburton, Tex., US) methylstyrene/acrylate copolymer lost circulation material
  8 lb/bbl LE Supermul® (Halliburton, Tex., US) polyaminated fatty acid emulsifier
  2 lb/bbl Rhemod L® (Halliburton, Tex., US) modified fatty acid containing dimeric and trimeric fatty acids viscosifier
  92.5 lb/bbl glycerine carbonate
  55.73 lb/bbl diesel (Halliburton, Tex., US) non-polar oil
  119.8 lb/bbl Baroid® (Halliburton, Tex., US) barite weighting agent
  25.28 lb/bbl water
  10.14 lb/bbl calcium chloride.

Example 3—Methods of Measuring Dielectric Constant and Electric Conductivity of an Electrocrushing Drilling Fluid The dielectric constant and electric conductivity of an electrocrushing drilling fluid, such as one disclosed herein, may be measured using a network analyzer or inductance, capacitance and resistance (LCR) meter equipped with a particular fixture, such as a liquid test fixture, to allow the measurement. Suitable measurement equipment includes that produced by Agilent (Santa Clara, Calif.) and Keysight (Santa Rosa, Calif.), particularly the Keysight 16452A Liquid Text Fixture and the Agilent E4991B Impedance Analyzer. Such equipment may be used in accordance with manufacturer instructions.

One of ordinary skill in the art may determine how to determine the frequency dependent dielectric constant and the electric conductivity of an electrocrushing drilling fluid using the above-identified or similar equipment by applying the following principles, typically as implemented in a programmed computer receiving data from equipment.

The frequency dependent complex dielectric constant of a fluid may be determined by the following equation, which includes its real and imaginary parts:

$$\varepsilon(\omega) = \varepsilon'_r(\omega) + j\varepsilon''_r(\omega) = \varepsilon_r(\omega)\varepsilon_0 + j\frac{\sigma(\omega)}{\omega}$$

where:
$\varepsilon(\omega)$ is the frequency dependent complex dielectric constant
$\varepsilon'_r(\omega)$ is the real part of the dielectric constant
$\varepsilon''_r(\omega)$ is the imaginary part of the dielectric constant
and $j = \sqrt{-1}$.

In addition, $$\varepsilon'_r(\omega) = \varepsilon_r(\omega)\varepsilon_0$$

so that $$\varepsilon_r(\omega) = \frac{\varepsilon'_r(\omega)}{\varepsilon_0}$$

where:
$\varepsilon_r(\omega)$ is the frequency dependent dielectric constant of the fluid
and $\varepsilon_0$ is the permittivity of free space = $8.85418782 \times 10^{-12}$ Farads/Meter.

Additionally, $$\varepsilon''_r(\omega) = \frac{\sigma(\omega)}{\omega}$$

and therefore, $$\sigma(\omega) = \omega\varepsilon''_r(\omega)$$

Where $\sigma(\omega)$ is the frequency dependent electric conductivity of the fluid.

Example 4—Methods of Measuring Dielectric Strength of an Electrocrushing Drilling Fluid Equipment suitable to measure the dielectric strength of an electrocrushing drilling fluid over a given rise time is generally not commercially available, but it may be constructed by attaching an adjustable voltage supply to electrodes immersed in the fluid and otherwise electrically insulated from one another such that an electric field ($\vec{E}$) may be created between the electrodes using the adjustable voltage supply when it applies a voltage (V) across the electrodes. The electrodes may be any shape, such as spheres or plates. The electrodes are separated by a distance D. An ammeter is located in the circuit between the adjustable voltage supply and the negative electrode. The adjustable voltage supply may be used to provide high voltage pulses with an adjustable peak voltage and rise time.

$\vec{E}$ is determined using the following equation:

$$\vec{E} = \frac{V}{D}$$

$\vec{E}$ electric field is a vector quantity and the direction of the electric field goes from the positive electrode toward the negative one. One may alter the electric field by adjusting either V or D.

For a given rise time, for a series of voltage pulses across the electrodes and through the electrocrushing drilling fluid under test, the peak electric field ($\vec{E}$) for each pulse is increased until conduction current is observed in the ammeter. Conduction current indicates electrical breakdown of the liquid. For a given rise time, the electric field the electrocrushing drilling fluid can support without breakdown (and hence measurement of a current by ammeter) is its dielectric strength for that rise time. By varying the rise time and electric field and noting the electric field/rise time combinations where breakdown occurs, one may determine the dielectric strength of the electrocrushing drilling fluid as a function of rise time.

The disclosure provides at least two embodiments A and B.

A. An electrocrushing drilling fluid including a electrocrushing drilling base fluid including a polar oil, a non-polar oil or a combination thereof, and glycerine carbonate, wherein the electrocrushing drilling base fluid has a dielectric constant of at least 6 at 100 kHz frequency.

B. An electrocrushing drilling system including a drill string, an electrocrushing drill bit attached to the downhole end of the drill string for fracturing rock in a formation, and an electrocrushing drilling fluid that circulates downhole through the drill string and then moves the fractured rock uphole. The electrocrushing drilling fluid is that of embodiment A.

Both of embodiments A and B may have one or more of the following additional elements in any combination, unless clearly mutually exclusive: i) the electrocrushing drilling base fluid may have a dielectric strength of at least 100 kV/cm, at least 150 kV/cm, or at least 330 kV/cm at 10 microseconds rise time; ii) the electrocrushing drilling base fluid may have an electric conductivity of less than $10^{-4}$ or less than $10^{-5}$ mho/cm; iii) the electrocrushing drilling base fluid may have an oil:glycerine carbonate ratio of between 0.85:1 and 1.15:1 (v:v); iv) the polar oil may include a vegetable oil, an ester oil, or any combinations thereof; v) the non-polar oil may include a mineral oil, a diesel oil or fuel, a paraffin-based oil, an oil containing branched and linear aliphatic hydrocarbons having between 8 and 26 carbon atoms and a boiling point in the range of 120° C. to 380° C., an oil containing hydrocarbons having between 10 and 16 carbon atoms and a viscosity of 1.5 to 2 cSt at 40° C., or any combinations thereof; vi) the electrocrushing drilling fluid may further include water; v) the electrocrushing drilling fluid may further include glycerin; vi) the electrocrushing drilling fluid may further include at least one additive including an electrical additive, a lost circulation material, a rheology modifier, a weighting agent, an emulsifier, a corrosion inhibitor, a defoamer, a shale stabilizer, a lubricant, a wetting agent, a dispersing agent, a shale inhibitor, a pH-control agent, a filtration-control agent, an alkalinity source, a foamer, a viscosifier, a thinner, a deflocculent, or any combinations thereof; vii) the electrocrushing drilling base fluid may have a dielectric strength of at least 330 kV/cm at 10 microseconds rise time.

Although the present disclosure has been described with several embodiments, various changes and modifications may be suggested to one skilled in the art. It is intended that the present disclosure encompasses such various changes and modifications as falling within the scope of the appended claims.

The invention claimed is:

1. An electrocrushing drilling fluid comprising a electrocrushing drilling base fluid comprising:
   a polar oil, a non-polar oil or a combination thereof; and glycerine carbonate;
   wherein the electrocrushing drilling base fluid has a dielectric constant of at least 6 at 100 kHz frequency; and
   wherein the electrocrushing drilling base fluid has an electric conductivity of less than $10^{-5}$ mho/cm.

2. The electrocrushing drilling fluid of claim 1, wherein the electrocrushing drilling base fluid has a dielectric strength of at least 100 kV/cm at 10 microseconds rise time.

3. The electrocrushing drilling fluid of claim 1, wherein the electrocrushing drilling base fluid has an oil:glycerine carbonate ratio of between 0.85:1 and 1.15:1 (v:v).

4. The electrocrushing drilling fluid of claim 1, wherein the polar oil comprises a vegetable oil, an ester oil, or any combinations thereof.

5. The electrocrushing drilling fluid of claim 1, wherein the non-polar oil comprises a mineral oil, a diesel oil or fuel, a paraffin-based oil, an oil containing branched and linear aliphatic hydrocarbons having between 8 and 26 carbon atoms and a boiling point in the range of 120° C. to 380° C., an oil containing hydrocarbons having between 10 and 16 carbon atoms and a viscosity of 1.5 to 2 cSt at 40° C., or any combinations thereof.

6. The electrocrushing drilling fluid of claim 1, further comprising water.

7. The electrocrushing drilling fluid of claim 1, further comprising glycerin.

8. The electrocrushing drilling fluid of claim 1, further comprising at least one additive comprising an electrical additive, a lost circulation material, a rheology modifier, a weighting agent, an emulsifier, a corrosion inhibitor, a defoamer, a shale stabilizer, a lubricant, a wetting agent, a dispersing agent, a shale inhibitor, a pH-control agent, a filtration-control agent, an alkalinity source, a foamer, a viscosifier, a thinner, a deflocculent, or any combinations thereof.

* * * * *